Aug. 14, 1923.
E. H. BELDEN
1,464,920
BRAKE CONTROL MECHANISM
Filed April 25, 1918    2 Sheets-Sheet 1
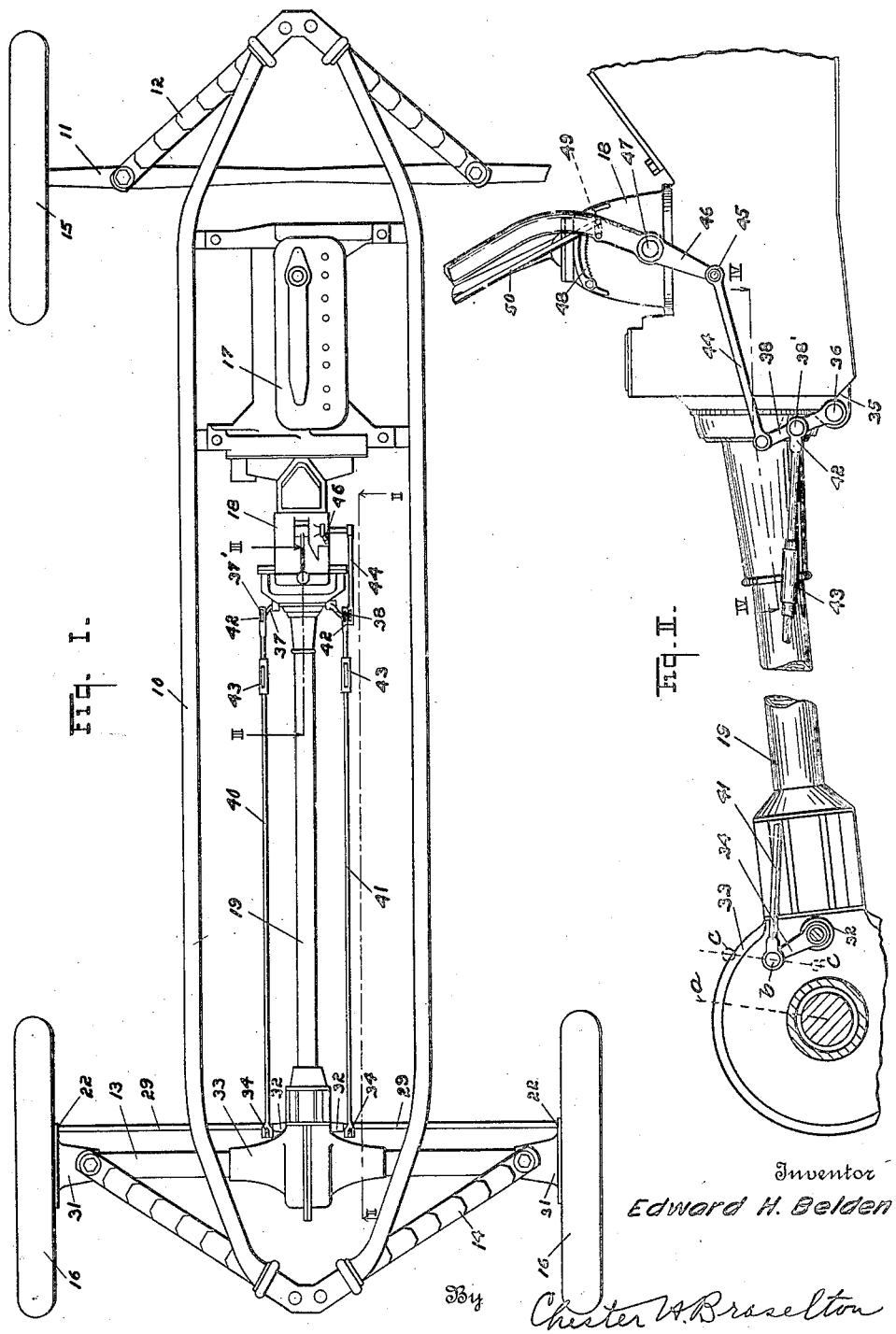
Inventor
Edward H. Belden
By Chester H. Braselton
Attorney

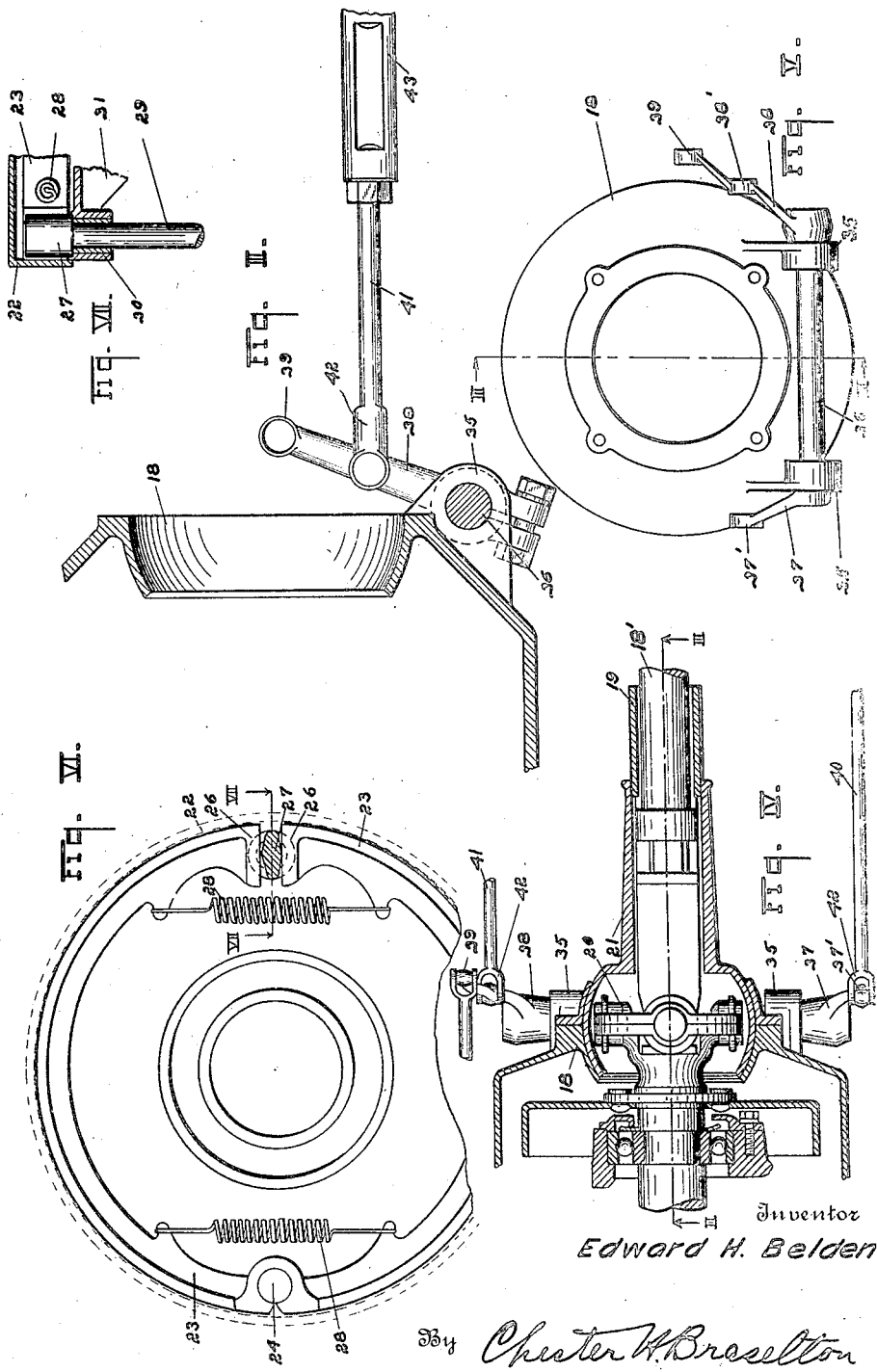

Patented Aug. 14, 1923.

1,464,920

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

BRAKE-CONTROL MECHANISM.

Application filed April 25, 1918. Serial No. 230,746.

*To all whom it may concern:*

Be it known that I, EDWARD H. BELDEN, a citizen of the United States, residing at Toledo, in the county of Lucas and State of Ohio, have invented certain new and useful Improvements in Brake-Control Mechanism, of which I declare the following to be a full, clear, and exact description.

This invention relates to an improvement in brake control mechanism for motor vehicles.

The invention has for its primary object, to provide an internal brake and operating connection which can be mounted more compactly and be more effective than the internal brakes heretofore known and used.

It is a further object of the invention to provide a simple and inexpensive brake operating mechanism which can be produced and assembled on a motor vehicle at a comparatively low cost.

Further objects, and objects relating to the economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which, Fig. I is a top plan view of the chassis of a motor vehicle embodying my invention.

Fig. II is a side elevation on the line II—II in Fig. I, the rear axle and one brake rod being shown in cross-section.

Fig. III is a detail, sectional view showing the mounting of my improved internal brake on one side of the transmission gear case, the section being taken substantially on the the line III—III of Figs. I and V.

Fig. IV is a fragmentary, horizontal, sectional view taken substantially on the line IV—IV in Fig. II.

Fig. V is a rear elevation of the transmission gear case and shows the means on the gear transmission case for mounting part of the brake operating mechanism.

Fig. VI is a view in side elevation of one end of the rear axle, the wheel being removed, said view showing the construction of the brake.

Fig. VII is a detail, fragmentary, sectional view, taken on the line VII—VII in Fig. VI.

In the drawings, similar reference numerals refer to similar parts throughout the several views.

Considering the numbered parts of the drawing and referring to Fig. I, a frame 10 is supported from the front axle 11 by springs 12 and from the rear axle casing 13, by springs 14. Said front axle carries the usual steering wheels 15 and the rear axle the driving wheels 16. An engine 17 is mounted on the frame 10 and drives the rear live axle through the transmission, housed in the case 18, and the propeller shaft 18' (Fig. IV) housed in the tube 19. The usual universal joint 20 (Fig. IV) is provided for connecting the transmission to the propeller shaft, said universal joint being housed in the casing member 21 which engages in a socket provided on the transmission case 18. The brake flanges 22 (indicated by the dotted lines in Fig. VI) are provided in the usual manner on the rear wheels and the brake shoes 23 are pivoted at 24 within the brake hubs formed on the ends of the rear axle so as to engage the inner surface of the corresponding flange 22 when the shoes are spread or opened on their pivot 24. The free ends of the brake shoes 23 have the surfaces or heads 26, between which the cam 27 is disposed, so that, as this cam is rotated the shoes 23 will be spread to firmly engage the flange 22 on the wheels 16 and thereby brake the same. Springs 28 are provided, connected at their opposite end to the opposite shoes 23, and thereby normally drawing said shoes toward each other and holding them out of braking engagement with the flange 22.

The cams 27 are formed on the outer ends of the rock shafts 29, (Figs. VI and VII). The rock shafts 29 are journaled near their outer ends in the bosses 30 provided in the members 31 on the ends of the rear axle casing 13, and their inner ends are journaled in the sockets 32 formed on the differential casing 33. These rock shafts are further provided near the sockets 32 with arms 34 (Fig. I).

On the rear face of the transmission case 18, (Figs. II, III and V), are formed two ears 35 in which is journaled the rock shaft 36 having secured on its ends the arms 37 and 38, the arm 37 having the head 37' and the arms 38 having the head 39 and the opening 38'. Rods 40 and 41 are provided with yokes 42 on their respective ends and intermediate these ends with turn buckles 43. The yokes on the rear ends of the rods are pivoted to the upper ends of the arms 34 provided on the rock shafts 29. The forward end of the rod 40 is connected by a pin to the head 37' on the arm 37, provided on the rock shaft 36, and the forward end of the rod 41 is similarly connected at 38' to the arm 38 provided on the rock shaft 36.

The rear axle being connected to the rear end of the frame by springs 14, it will be understood that as the rear axle moves up and down, it moves in a path approximating the arc of a circle. The brakes and brake arms 34 carried by the axle accordingly move in a similar path, and it is consequently desirable that the points 37' and 38', where the forward ends of the links 40 and 41 are pivoted, be substantially equal distances from the upper and lower limits of movement of the pivot points b. The path of movement of the axle as viewed in Figure II would appear substantially as the arc of a very large circle, which for convenience may be assumed to be a straight line as indicated by the dotted line a. The points 37' and 38' should therefore lie somewhat below the level of the pivotal connections b of the links 40 and 41 with the arms 34, so that the links extend substantially perpendicular to the line a, and in view of the inclination of the propeller shaft and the relative proportions of the arms 34 and 38, the shaft 36 must be journaled at the lower part of the gear casing and below the propeller shaft housing. The points 37' and 38' are thus approximately equidistant from the two extreme positions indicated by dotted circles c of the connections b, due to the flexing of the springs 14. By this mechanism, the variations in the movement of the brakes by reason of the movement of the rear axle towards and from the frame is reduced to a minimum, and the danger of setting or materially varying the tension of the brakes when moving over inequalities of the road is eliminated.

A link 44 having a yoke on each of its ends, (Fig. II) is pivoted at one end to the head 39 on the arm 38 provided on the rock shaft 36, and the other end of said link is pivotally connected at 45 to the lower end of a hand brake lever 46, the said lever being pivoted at 47 on the transmission case 18. A ratchet 48 is fixed to the transmission case 18 and engaged by the pawl 49 which is controlled by a rod 50 in the usual manner.

From the above description, my invention can be readily understood. When it is desired to operate the internal brake, the hand brake lever 46 is operated in the usual manner. This moves the lower end of the lever forward, pulling the link 44, which in turn draws the arm 38 forward. This forward movement of the arm 38 turns the rock shaft 36 in a corresponding direction which in turn draws the rods 40 and 41 forward whereby the rock shafts 29 are rocked and the cams 27 are turned so as to spread the brake shoes 23 which engage the flanges 22 on the rear wheels and thereby brake the same. A reversal of the hand lever 46 will relieve the pressure, as is obvious.

It is apparent from the structure and arrangement of parts in my improved braking mechanism that the pressure applied to the hand brake lever is immediately effective on the shoe brakes, which is a very desirable feature in emergency brakes on motor vehicles. Also, when knocking down a car for shipment, by disconnecting the rods 40 and 41 the engine and transmission mechanism can be removed as a unit. Following this the chassis and springs can be removed as another unit, which will leave the rear axle structure and its associated parts as a third unit. In assembling the car the operation can be reversed and the same advantages obtained.

I am aware that this embodiment of my invention, which I have here shown and described, is susceptible of considerable variation without departing from the spirit of my invention, but I have found that this particular embodiment is desirable from many standpoints, and, therefore, I desire to claim the same specifically, as well as broadly, as indicated by the appended claims.

Having thus described my invention, what I claim as new and desire to secure by Letters Patent, is:

1. The combination with a rear axle structure and breaks carried thereby; a frame connected to said axle structure to move downwardly and rearwardly relative thereto; a casing for transmission mechanism carried by said frame; a hand lever pivoted on said casing; a shaft journaled in the lower portion of said casing intermediate of said brakes and hand lever; spaced lever arms on said shaft; a link member between one of said lever arms and said hand lever; and connecting links between said lever arms and the brakes, said links being arranged to incline downwardly from their rear ends.

2. The combination with a rear axle structure and brakes carried thereby, a frame supported by and extending beyond said axle, springs carried by said frame and extending downwardly and forwardly to said axle, a casing for transmission mechanism carried by said frame, a propeller shaft housing extending forwardly from the rear axle structure and having a universal joint connection with said transmission casing, a hand lever pivoted on said casing, a shaft journaled on said casing below the universal joint connecting the propeller housing with the casing and extending upon opposite sides of the center thereof, arms carried by the ends of said shaft, links connecting said arms with said brakes, said links being inclined to lie substantially perpendicular to the path of movement of said axle due to the flexing of said springs, and a connection between one of said arms and said hand lever.

3. In a motor vehicle, the combination of a chassis, a rear axle, resilient means connecting said chassis and said axle whereby the path of movement of said axle relative to said chassis is inclined to the vertical, brake mechanism carried by said axle, brake operating mechanism carried by said chassis, and means connecting said brake mechanism and said brake operating mechanism extending substantially at right angles to said path of movement of the rear axle.

4. In a motor vehicle, the combination of a chassis, a rear axle, springs connecting said chassis and said rear axle arranged to cause said axle to move relatively to said chassis in a path inclined to the vertical, brake mechanism carried by said brake operating mechanism carried by said chassis, and a rod connecting said brake mechanism with said operating mechanism inclined to extend at substantially a right angle to said path of movement of the rear axle.

5. In a motor vehicle, the combination of a chassis, a rear axle, springs secured to the end of said chassis and extending forwardly and downwardly to said axle, brake mechanism carried by said axle, brake operating mechanism supported from said chassis, and pull rods connecting said brake mechanism with said operating mechanism said rods inclining downwardly from said brake mechanism whereby relative movement of said axle and chassis due to the flexing of said springs has substantially no effect upon the tension of said rods.

6. In a motor vehicle, the combination of a rear axle, a chassis supported by and extending beyond said axle, cantilever springs carried by said chassis and extending downwardly and forwardly to said axle, a transmission casing carried by said chassis and having lugs on its lower portion, a lever pivotally mounted in said lugs, a brake mechanism at each end of said axle comprising a rock shaft, and a lever therefor and pull rods operatively connecting said first lever with said last levers, said rods being inclined to lie substantially perpendicular to the path of movement of said axle due to the flexing of said springs.

In testimony whereof, I affix my signature.

EDWARD H. BELDEN.